Figure 1:
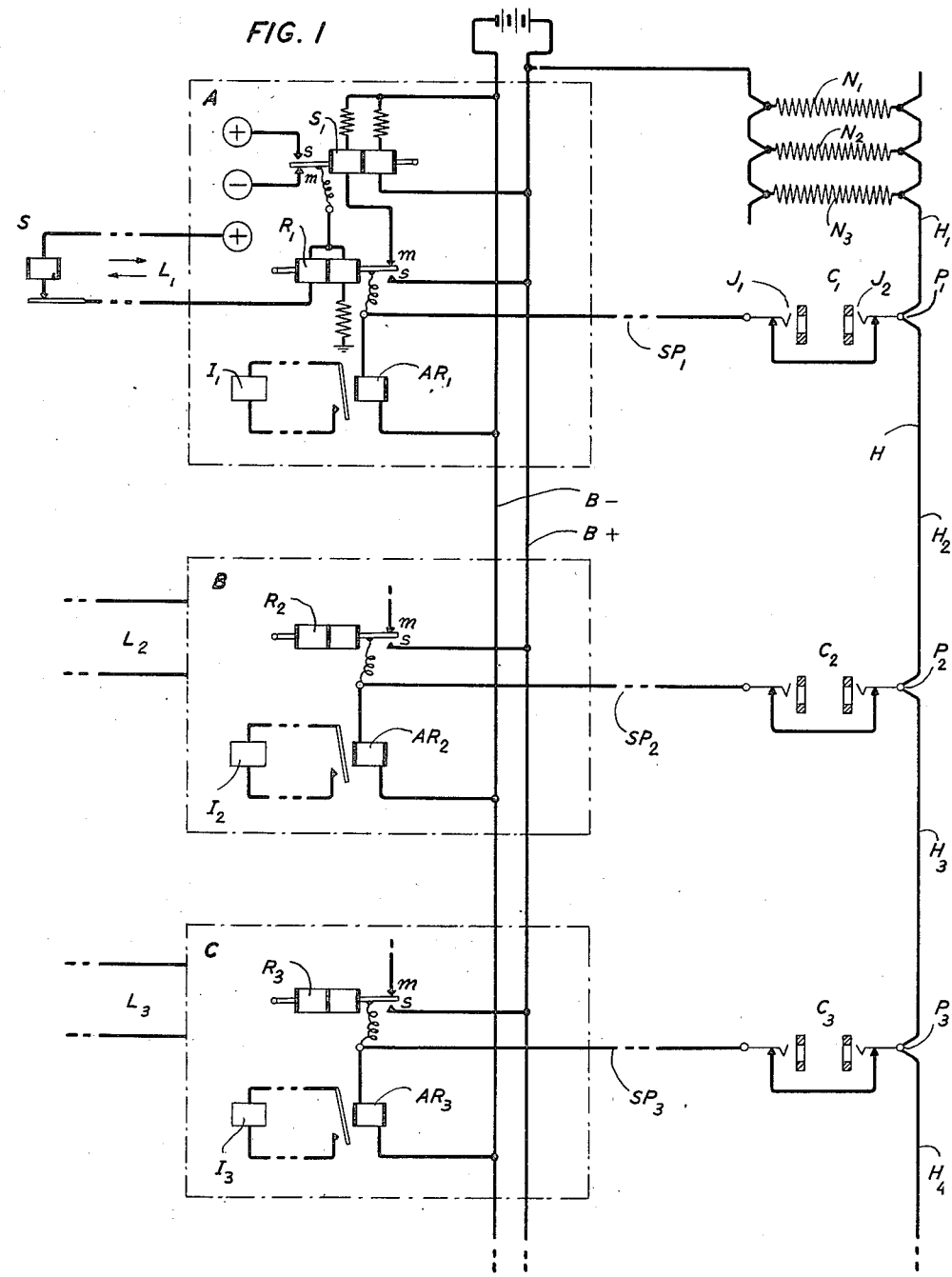

Feb. 2, 1937.　　　　F. S. KINKEAD　　　　2,069,251
INTERCONNECTING TELEGRAPH REPEATER SYSTEM
Filed July 24, 1935　　　2 Sheets-Sheet 2

INVENTOR
F. S. KINKEAD
BY
J. W. Schmied
ATTORNEY

Patented Feb. 2, 1937

2,069,251

UNITED STATES PATENT OFFICE 2,069,251

INTERCONNECTING TELEGRAPH REPEATER SYSTEM

Fullerton S. Kinkead, Ridgefield Park, N. J., assignor to Bell Telephone Laboratories, Incorporated, New York, N. Y., a corporation of New York Application July 24, 1935, Serial No. 32,867

7 Claims. (Cl. 178—69)

This invention relates to test circuits for telegraph repeating systems and more particularly to test circuits for use in conjunction with a plurality of intercommunicating two-way repeaters.

A telegraph repeating system has recently been developed in which a plurality of repeaters, which may include one dozen or more repeaters, are interconnected for multiple operation in response to signals incoming to any one of the repeaters. The repeaters are interconnected by a one-wire circuit which, in marking condition of all the repeaters, is in effect currentless or nearly so and therefore in itself can give no indication of accidental opens or disconnections in the one-wire circuit. The arrangement is such that comparatively long connections may be used between the board on which the repeaters are mounted and the board on which the interconnections are set up; for this reason a connection may accidentally be removed or impaired at almost any time without giving any manifestation thereof.

It is therefore an object of the invention to provide a continuous test for an interconnecting circuit of the type referred to, which is normally currentless or carries too litle signaling current for operation of testing devices.

It is another object to provide a testing system of this type which will use a very small current as compared with the signaling current to the repeaters.

It is a further object to provide a testing system of this type which will not be affected by signals passing through the interconnecting circuit; the testing current furthermore should not interfere with signal impulses in the interconnecting circuit.

It is a further object of the invention to provide a testing system of this type which will respond to an open at practically any point within the extremities of the interconnecting one-wire circuit.

A more specific object is to provide a plurality of alarm operating test relays whereby the location of a break or open in the interconnecting circuit and its branches may be readily determined.

These and other objects of the invention may be attained in accordance with a preferred embodiment of the invention by providing a test circuit which includes relay means for the alarm device and a source of potential, and which is connected to some or all of the extremities of the one-wire circuit interconnecting a plurality of repeaters.

In accordance with a feature of the invention highly sensitive relays are used in a high resistance test circuit.

In accordance with another feature of the invention the test circuit is operated from the source of marking potential used for operating the repeaters over the interconnecting circuit and high resistance means are included in the test circuit to prevent operation of the repeaters during marking condition.

In accordance with another feature provision is made for adding a high resistance unit to the test circuit for each alarm relay added to the test circuit.

In accordance with a specific feature the test relays are each connected as closely as possible to the point at which the corresponding branch is connected to its repeater and the high resistance units are connected in multiple at one extremity of the multiple connection between the branches.

As already stated the interconnecting repeating system to which the invention is particularly adapted uses a single conductor for connecting a comparatively large number of repeaters for line or loop circuits in multiple, which conductor may appropriately be termed the "hub". From each repeater a single conductor or "spoke" is connected to the hub usually through switching means which may be manually or automatically operated, or may be permanently set. Thus, in the case of a so-called lease set-up the single wire connections or spokes may be directly soldered or clamped together and one or more jacks may be included in the spoke of each repeater for disconnection of the repeater from the hub and for connection by means of patching cords of either the repeater or the hub to another circuit such as a line circuit or a monitoring circuit.

In the case of the ordinary appearance of a line in a switchboard, a requested interconnection of a line with another line may be established by the plugging in of a single wire patching cord, and connections to other lines may be simultaneously set up through simple multiple jacks and other patching cords or in any other convenient manner.

The arrangement is particularly suitable for automatic set-up of interconnections as by relays or by more complicated switching means, since only a single connection need be established for each line and its repeater. It is furthermore evident that the interconnection of a great number of lines for broadcast purposes would be greatly facilitated by this arrangement.

Figure 2:
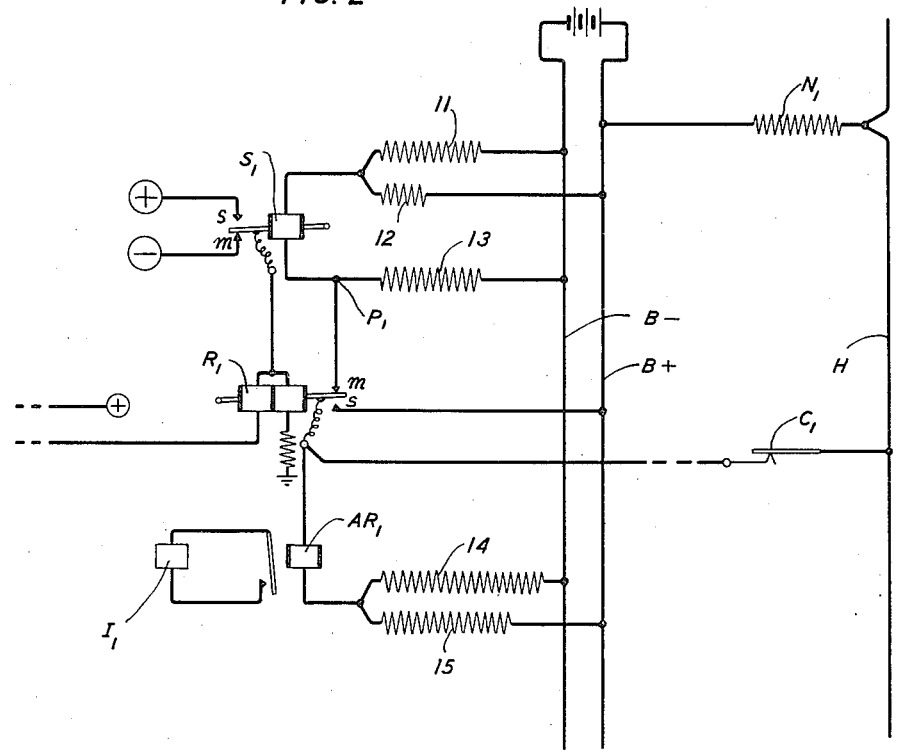

The invention will now be described in two of its preferred forms and reference will be made to the accompanying drawings in which:

Fig. 1 illustrates a telegraph repeater system for interconnection of a plurality of signaling circuits by means of a multiple circuit such as disclosed in an application for F. S. Kinkead and G. A. Locke, Serial No. 32,866, filed on even date herewith; Fig. 1 furthermore shows in a preferred form a testing system in accordance with the invention;

Fig. 2 shows a repeater similar to that of Fig. 1, but modified to reduce the current in the hub circuit; Fig. 2 also shows a testing circuit adapted for this type of repeater.

The repeater system shown in Fig. 1 comprises a line circuit $L_1$ connected through a repeater A, a line circuit $L_2$ connected through a repeater B, and a line circuit $L_3$ connected through a repeater C to an interconnecting circuit or hub $H_1$, $H_2$, etc.

The lines $L_1$, $L_2$ and $L_3$ may be two-way loop circuits each connected to a subscriber's station, which usually will be equipped with typewriters having a receiving winding and transmitting contacts as shown for line $L_1$. Lines $L_2$ and $L_3$ may be of the same type as $L_1$ or may be of any other well-known type such as one-way lines or four-wire circuits. In each case the repeaters will have their line side particularly adapted for requirements of their associated line circuits. The arrangement of the lines or loops and of the line side of the repeaters are of no importance in connection with the testing system proposed by the invention, for which reason only one type of line repeater circuit is shown in detail. Thus repeater A is shown substantially complete whereas repeaters B and C are illustrated only to such an extent as will be necessary for an understanding of the invention.

The repeater A is equipped with receiving relay $R_1$ and sending relay $S_1$. A suitable source of positive and negative potential is connected to the line side of the repeater.

For transmission of signals into the line circuit $L_1$ the relay $S_1$ is operated to its marking and spacing contacts, thereby applying negative and positive potential alternately through the differentially wound relay $R_1$ which remains unaffected. The signals continue through the line circuit to the subscriber's station and back to positive potential at the repeater A. Signals originating at the subscriber's station are transmitted by opening and closing of the line at the keyboard contacts. In this case the line winding of relay $R_1$ becomes alternately deenergized and energized and the relay is operated to its spacing contact by its biasing winding and to its marking contact by its line winding in a well-known manner.

The local side of the repeaters is supplied with current from a suitable source, which may be a battery, over the common conductors B+ and B—. It is, of course, possible for this purpose to use the same source as is used for the line side of the repeater.

The sending relay $S_1$ has a normally energized winding connected to conductors B+ and B— for operating the relay to its marking contact. The other winding of the relay $S_1$ is connected from conductor B— over the marking contact of the receiving relay $R_1$ and the spoke connection $SP_1$ to the hub H. The repeater B has a similar connection for a similar winding over the marking contact of relay $R_2$ and spoke connection $SP_2$ to the hub H. Similar connections may be traced through the repeater C or any other repeater which may be associated with this system, connections beginning at conductor B— and ending at the hub H.

It will thus be seen that when all the repeaters are in marking condition the hub H will be connected to the same potential of each repeater and that no signaling current will be flowing in the windings of the sending relays or in the hub circuit so long as this condition is maintained.

When a spacing signal arrives over line $L_1$ to operate relay $R_1$ to spacing, the circuit through the winding of relay $S_1$ will be opened so that this relay will remain unaffected. In the spacing condition of relay $R_1$, a circuit is closed from conductor B+ to the hub H which thus applies positive potential to all the windings of sending relays in other repeaters such as B and C thereby operating the sending relays for transmission of a spacing impulse over their associated line circuits.

When the line $L_1$ is again closed, relay $R_1$ returns to marking, disconnecting conductor B+ from the hub circuit and thereby deenergizing all the left-hand windings of the sending relays in the repeaters which then will be operated to marking by their right-hand biasing windings. In the repeater A the sending relay S will again be connected into the hub circuit ready for reception of signals from other repeaters.

It is evident that each station may continue to send until another station applies a break signal, which will connect the hub H to conductor B+ for its duration and thus cause all of the sending relays to operate to spacing for transmission of a similar break signal into their associated lines.

From the description given above it will be apparent that all signaling between the local side of all repeaters takes place over a single conductor circuit comprising the spokes $SP_1$, $SP_2$, etc., and the hub conductors $H_1$, $H_2$, etc. and that therefore all switching operations for adding repeaters to a hub circuit or for removing them therefrom will be confined to a single conductor for each repeater. This makes it possible to arrange all repeaters on bays and to arrange the apparatus necessary for making interconnection between them on a switchboard or testboard, remote from the repeaters, without resort to an excessive number of wires. The spokes SP may of course be soldered directly to the hub at the points P for the permanent interconnection of certain lines, as in the case of a lease set-up. However, even in this case it is convenient to arrange contact means $C_1$, $C_2$, $C_3$, respectively, for disconnection of any repeater from the hub circuit and temporary connection, for example, to a monitoring equipment or to some other line circuit upon special request. The switching means $C_1$, $C_2$, $C_3$ may each comprise a jack for connection by means of suitable patching cords to one or more other line circuits, or the switching means may be the contacts of a relay or of a more complex switching device for manual remote control of the set-up.

The testing system provided in accordance with the invention in a system of the type shown in the drawings and described above, may be adapted for use with different switching arrangements at the points $C_1$, $C_2$ and $C_3$ for connecting the repeaters to the hub circuit. However, the system is particularly adapted for interconnecting repeater systems which have a permanent set-up, as for lease purposes. Such a set-up may be in continuous use throughout the business day or at least should be in condition for use at any time during the day.

Since the hub circuit normally carries no signaling current it does not provide means for indicating whether or not it is in operative condition. Thus, a repeater might be disconnected from the hub circuit and consequently would not receive messages sent to other stations for a considerable time before the fault would be noticed. Disconnections may occur at any point in the hub circuit whether at soldering or clamping points or at contact points in the jacks included in the spokes; also there might be accidental plugging into the jacks in the spokes, or the spoke conductors might be accidentally interchanged or broken or otherwise interrupted between the repeater bays and the testboard.

For the purpose of applying a continuous test to a particular repeater set-up the invention provides a testing arrangement according to which each repeater includes a test relay $AR_1$, $AR_2$ and $AR_3$, etc., connected to the extreme repeater end of the corresponding spoke connections $SP_1$, $SP_2$, $SP_3$, etc., for example, to the terminal post of relay $R_1$ for the spoke connection. These relays should preferably be highly sensitive to use very little current for their operation, and may be arranged to operate an indicator or alarm circuit of any desirable kind, such as is schematically indicated at $I_1$, $I_2$, $I_3$. The alarm or test relays, such as $AR_1$, are normally energized over the spoke conductor and any contacts included therein and a portion of the hub circuit such as $H_1$, a bank of resistances $N_1$, $N_2$, $N_3$, etc., from a source which may be the local source connected to conductors B— and B+ as shown in the drawings. However, another independent source may be used for this purpose which may be of any desired kind to operate any desired type of alarm relay. Thus the alarm relay might be an alternating current relay operated from a source of alternating current over the hub circuit.

Thus for each repeater, an alarm relay AR will be connected from the conductor B— to the hub circuit and in order that the current in the relays may be of the correct value a high resistance N is connected for each relay between the hub conductor and the conductor B+.

Thus, when the hub circuit is intact, all the AR relays will be operated by a small current over the hub circuit and in this condition will hold their individual indicator circuits open at their contacts.

Whenever signals are transmitted over the hub circuit to operate relay $R_1$ to spacing the AR relays will be directly connected between the conductors B+ and B— and thus will remain energized.

However, when a break occurs in the hub circuit one or more of the AR relays will be deenergized to operate one or more of the indicator circuits. Thus, if only indicator $I_1$ should be operated by the deenergization of relay $AR_1$, this would indicate a break in the circuit beginning at conductor B— through relay $AR_1$, spoke connection $SP_1$, jacks $J_1$ and $J_2$ and point $P_1$. If only indicator $I_2$ should be operated that would indicate a break in a similar connection over spoke $SP_2$ up to the hub circuit. If $I_2$ and $I_3$ and subsequent indicators should be operated that would indicate a break in the hub connection $H_2$ from point $P_2$ to point $P_1$. It would thus be possible by observation of the various indicators to readily locate a fault in the whole hub circuit inasmuch as the alarm relays are connected to the extreme ends of the spoke connections and the connection through the resistances N is made at one extreme end of the hub connection H.

It will be noted that with this test arrengement a small current will continuously be flowing in the hub circuit and that therefore the hub conductor will be under an intermediate potential. However, since the potential of the low resistance hub conductor is practically uniform throughout its length all the operating windings of the sending relays in the repeaters will be subject to the same potential difference, namely, that between the B— conductor and the hub conductor; with the resistance of the windings of the AR relays small as compared with the high resistances N this potential difference may be kept small enough to insure that not enough current flows through the S relays to open their marking contacts during all-marking condition and until the time when a receiving relay applies the potential of the B+ conductor directly to the hub circuit. At such time the sending relays will be operated to spacing just as described above.

It will thus be seen that the signaling circuit and the test circuit, though they have conductors in common, do not usually interfere with each other and that the indicator system will indicate faults not only in the hub circuit as intended but also in its own connections. By the use of very sensitive relays the current consumption by the test system may be negligible.

When the hub circuit is not permanently set up it will be necessary to arrange for the addition of a resistance N for each repeater added to the hub circuit and for the removal of a resistance for each repeater disconnected from the hub circuit. Such switching in of resistances may be performed automatically together with the setting up of the spoke connection in any desired manner. In this case it may be desirable for the purpose of simplification to connect the resistance associated with a particular repeater directly to the spoke circuit, as at point $P_1$ or at the tip terminal of jack $J_1$ for repeater A, in which case the test circuit would serve to indicate faults only in the individual spoke circuits.

A modified arrangement for the local side of the repeaters has been proposed with the main object of reducing the current in the hub circuit. Such an arrangement is disclosed in a patent application for G. C. Cummings, Serial No. 32,858 filed on even date herewith.

A repeater circuit corresponding to repeater A, shown in Fig. 1, but rearranged in accordance with the application Serial No. 32,858 is shown in Fig. 2. In this arrangement the operating winding of relay $S_1$ is included in a resistance network connected to the conductors B+ and B— in such a manner that a marking current will normally flow from conductor B+ through resistance 12, the relay winding and resistance 13 to conductor B—. During this condition the hub circuit will be connected over the marking contact of relay $R_1$ to an intermediate potential in the circuit just traced.

When another repeater places spacing potential on the hub H the current in the winding of relay $S_1$ is reversed and the relay is operated to spacing.

When the test circuit is to be applied to a repeater of this type in accordance with the invention, it will, of course, be necessary to arrange for a potential distribution in the test circuit whereby the hub circuit during all-marking conditions will be at the same potential in the test circuit as in the signaling circuit with respect to the common source of potential. In accordance with the embodiment shown in Fig. 2 a resistance network comprising resistances 14 and 15 is connected across the conductors B+ and B— to apply an intermediate potential to alarm relay AR₁; by proper proportioning of the resistance N₁ the potential drop over resistance N₁ due to the current through relay AR₁ may be made equal to the potential of point P₁ due to the bridge current through resistances 11 and 12 and the marking current through relay S¹.

When spacing potential is applied to the hub conductor H, relay AR¹ will remain operated while relay S₁ is operated to spacing.

By such an arrangement there will be no interference between the signaling circuit and the test circuit during transmission of signals.

It is evident that by adding a resistance equal to N₁ for each repeater added to the hub circuit the potential of the hub will remain undisturbed.

What is claimed is:

1. A signal repeating system including a plurality of individual repeaters for two-way signaling between their associated line circuits and each having a line side and a local side, a one-wire multiple connection having a branch connected to each of said local sides for transmission of signals between them and an alarm system for detection of opens in said connection and branches comprising a plurality of relay means each connected to the extremity of one of said branches, high resistance circuit means connected to an extremity of said multiple connection and a source of potential connected between said relay means and said high resistance circuit.

2. A signal repeating system including a plurality of individual repeaters for two-way intercommunication between their associated line circuits, each of said repeaters having a line side and a local side, a one-wire multiple connection for said plurality of repeaters, individual one-wire circuit means for connecting the local side of each of said repeaters to said multiple connection, an alarm circuit connected to each of said individual circuit means at its point of connection to its associated local side, and a high resistance connected directly to said multiple connection to complete said alarm circuit for detection of opens in said multiple connection and said individual circuit means.

3. A signal repeating system including a plurality of individual repeaters for two-way inter-signaling between their associated line circuits and each having a line side and a local side, a one-wire multiple connection, individual one-wire circuit means connected from said multiple to points of equal potential in all of said local sides representing marking condition of said repeaters, and an alarm system for detection of opens in said multiple connection and in said individual circuit means comprising a plurality of normally energized relay means each connected between the repeater end of said individual circuit means and marking potential, and high resistance circuit means connected between said multiple connection and spacing potential, each of said local sides including contact means for applying direct spacing potential to its associated individual circuit means for simultaneously placing all the other of said repeating means in spacing condition.

4. A signal repeating system including a plurality of two-way repeaters each having a line side and a local side, said local sides each comprising an operating winding of a relay and contacts of another relay, a one-wire connection between all of said windings, a high resistance alarm system connected between the extremities of said one-wire connection for detection of opens in said connection and comprising a plurality of relay means and a source of potential for normal energization of said relay means over said connection, said contacts in spacing position applying spacing potential to said windings for signal repeating and to said relay means to hold said relay means energized.

5. A two-way telegraph repeater mounted on a panel, a one-wire signal connection from said repeater to another panel for connection to other repeaters and including serially connected contact means on said other panel, and an alarm system for detection of opens in said connection and comprising a high resistance circuit including relay means and a source of potential and connected to be completed through substantially the total length of said signal connection.

6. A signal repeating system in accordance with claim 3 in which the resistance of said high resistance circuit means is proportioned in accordance with the number of said relay means included in said alarm circuit to apply a potential to said multiple connection equal to that applied thereto by said local sides in marking condition.

7. A signal repeating system in accordance with claim 1 in which said high resistance circuit means comprises a plurality of equal resistance elements of the same number as the plurality of relay means included in said alarm circuit.

FULLERTON S. KINKEAD.